Dec. 8, 1959   J. B. PARSONS   2,916,031
REVERSE GEAR OPERATING SYSTEM FOR MARINE ENGINES
Filed Nov. 17, 1955   6 Sheets-Sheet 1
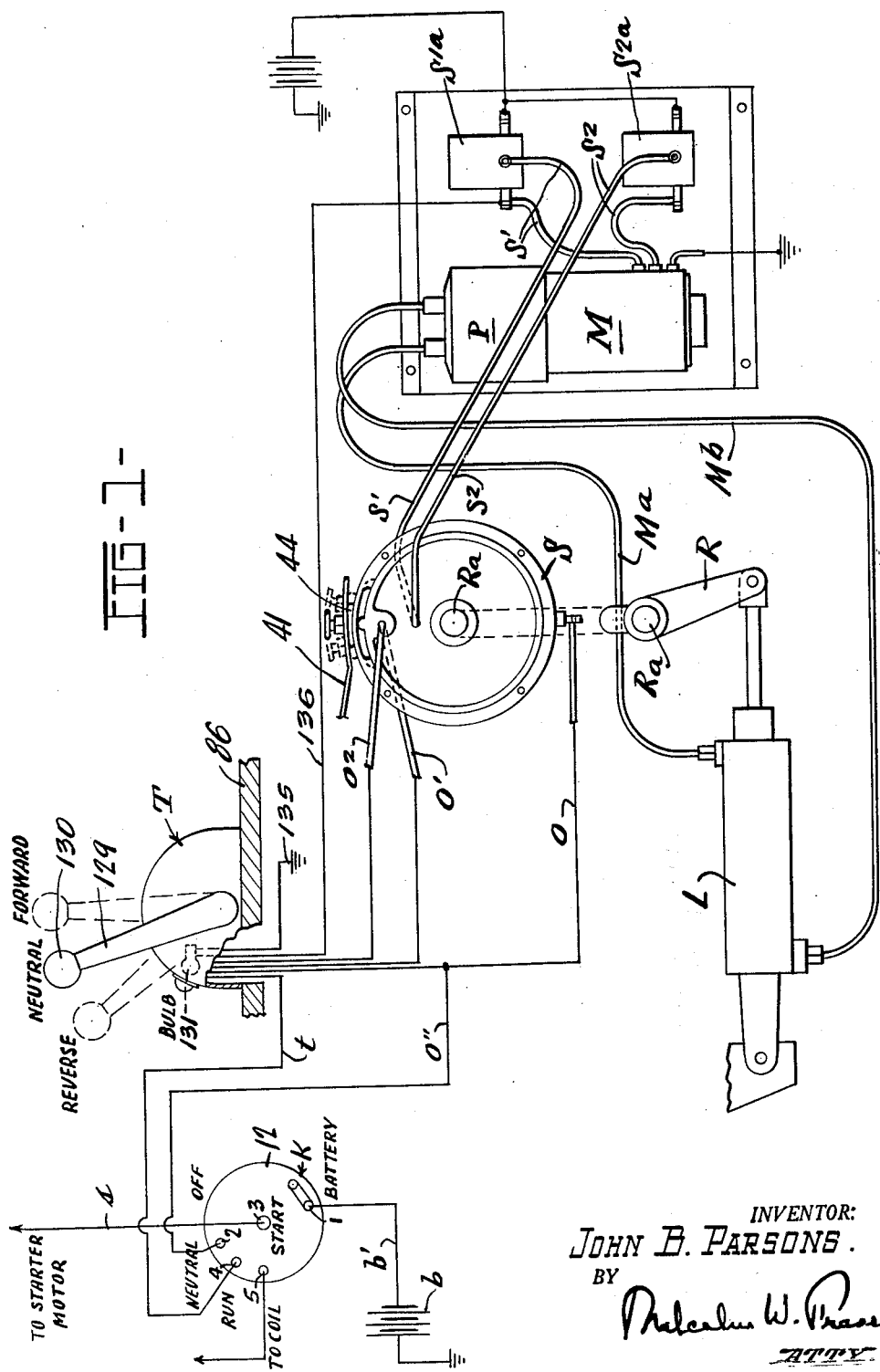
INVENTOR:
JOHN B. PARSONS.
BY
ATTY Dec. 8, 1959 J. B. PARSONS 2,916,031
REVERSE GEAR OPERATING SYSTEM FOR MARINE ENGINES
Filed Nov. 17, 1955 6 Sheets-Sheet 2
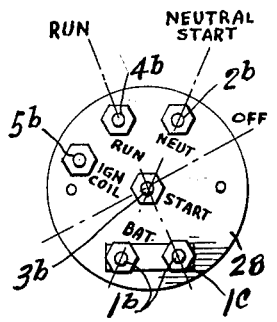
FIG-6-
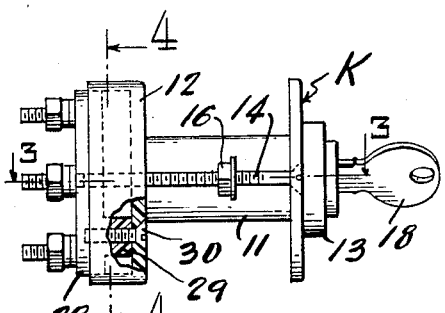
FIG-5-
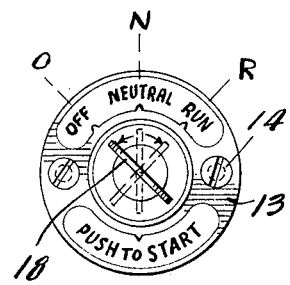
FIG-2-
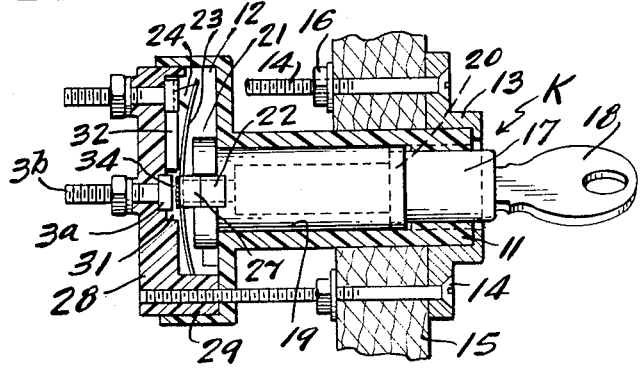
FIG-3-
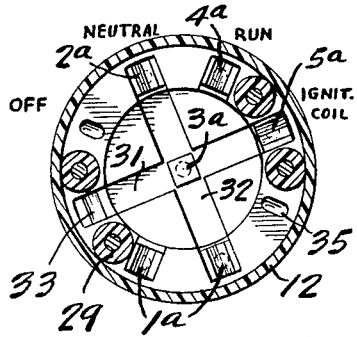
FIG-4-
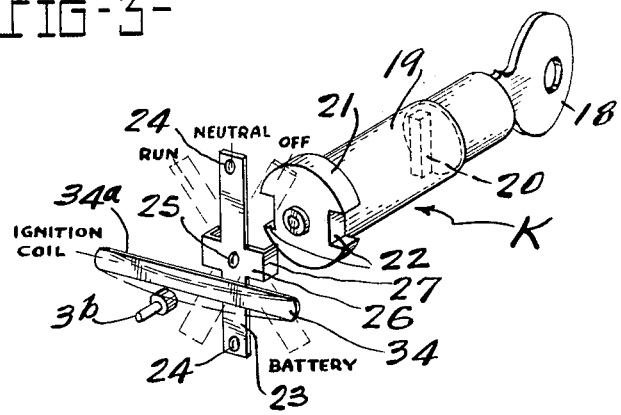
FIG-7-
INVENTOR:
JOHN B. PARSONS.
BY
ATTY.

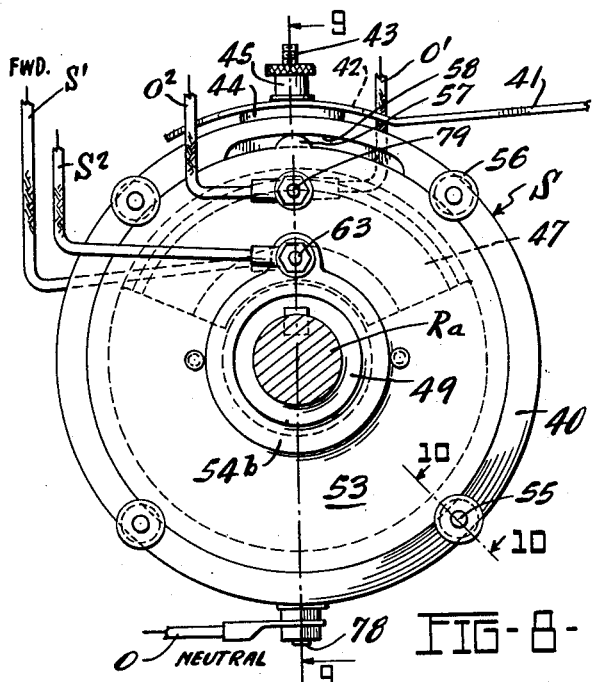
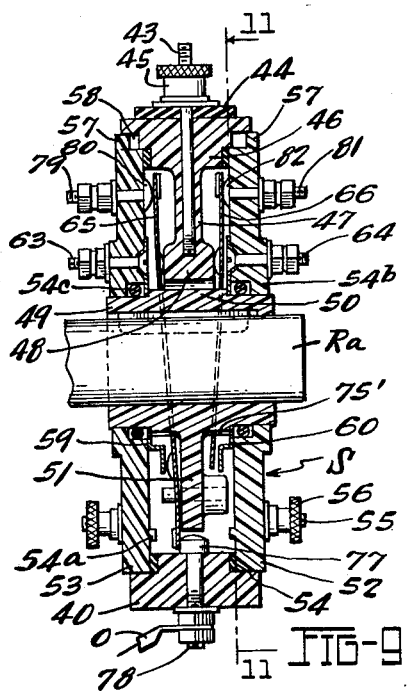
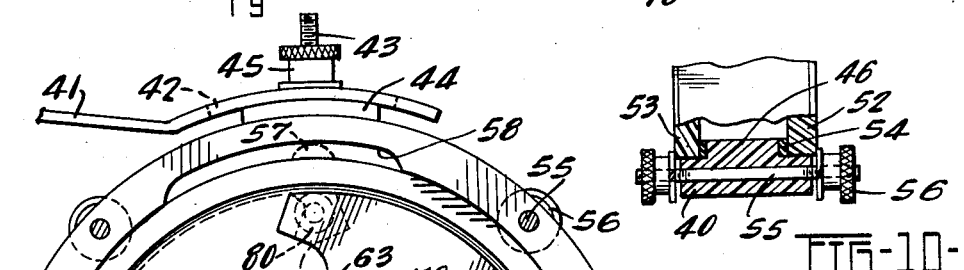
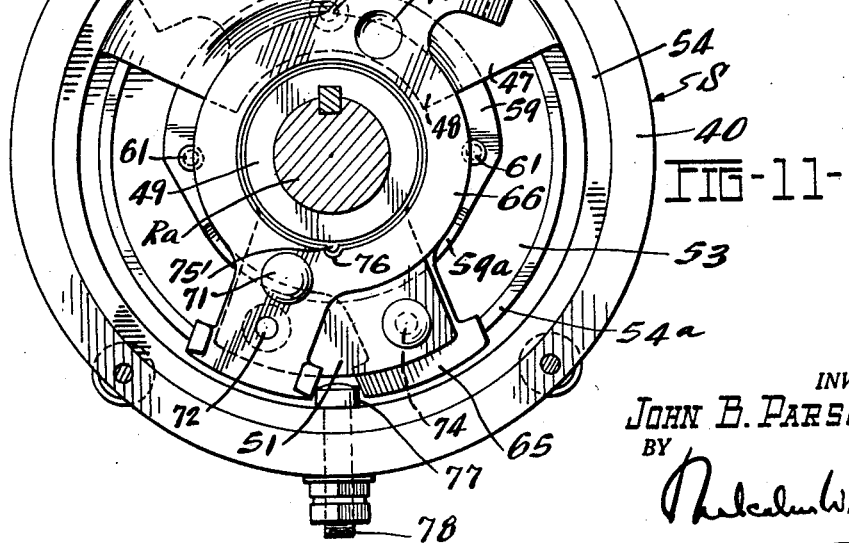

Dec. 8, 1959 J. B. PARSONS 2,916,031
REVERSE GEAR OPERATING SYSTEM FOR MARINE ENGINES
Filed Nov. 17, 1955 6 Sheets-Sheet 4
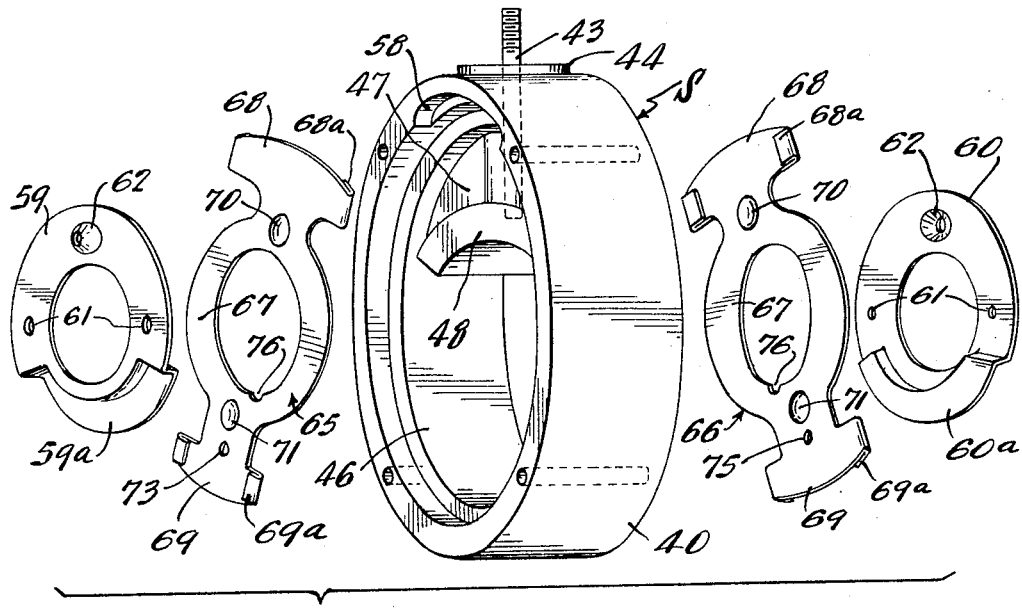
FIG-12-
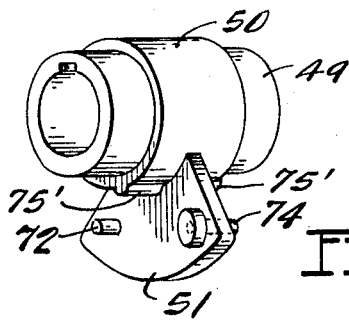
FIG-13-
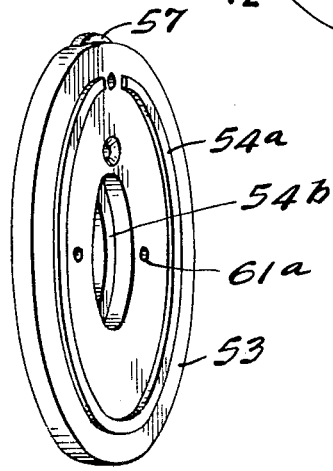
FIG-14-
INVENTOR:
JOHN B. PARSONS.
BY
ATTY.

Dec. 8, 1959 J. B. PARSONS 2,916,031
REVERSE GEAR OPERATING SYSTEM FOR MARINE ENGINES
Filed Nov. 17, 1955 6 Sheets-Sheet 5
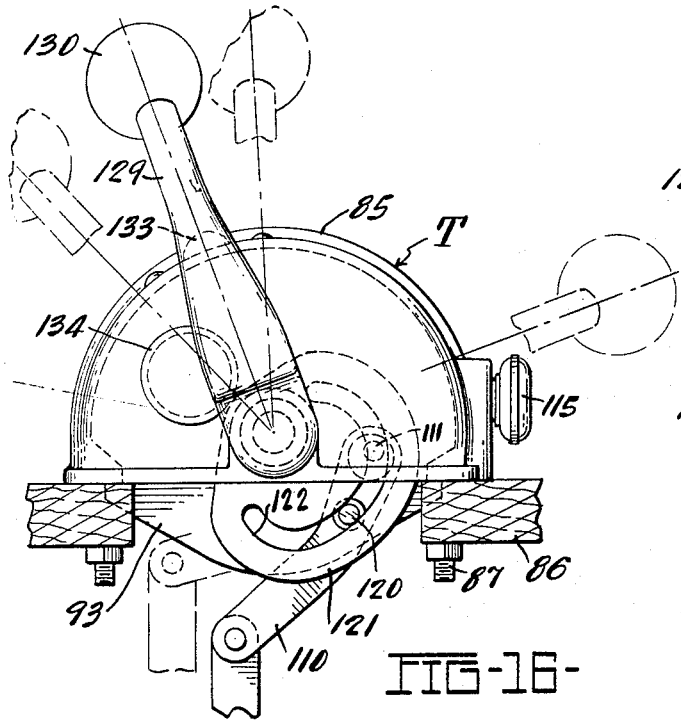
FIG-16-
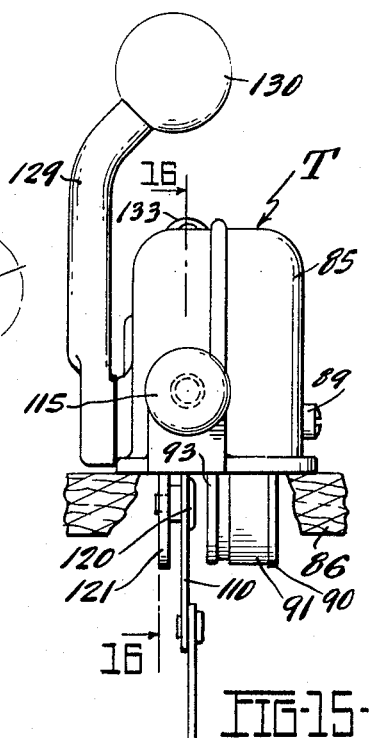
FIG-15-
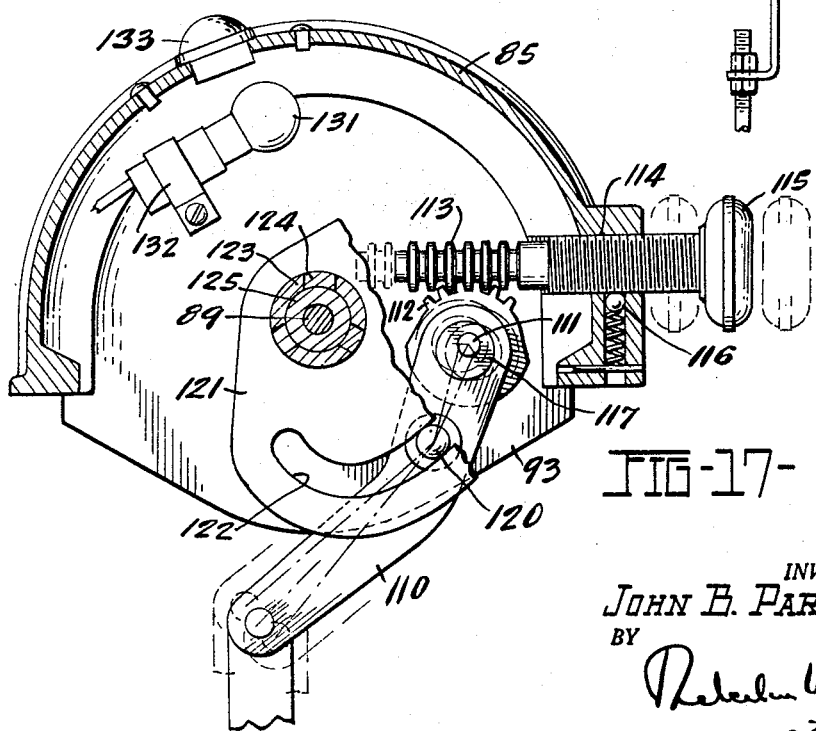
FIG-17-
INVENTOR:
JOHN B. PARSONS.
BY
ATTY.

Dec. 8, 1959 J. B. PARSONS 2,916,031
REVERSE GEAR OPERATING SYSTEM FOR MARINE ENGINES
Filed Nov. 17, 1955 6 Sheets—Sheet 6
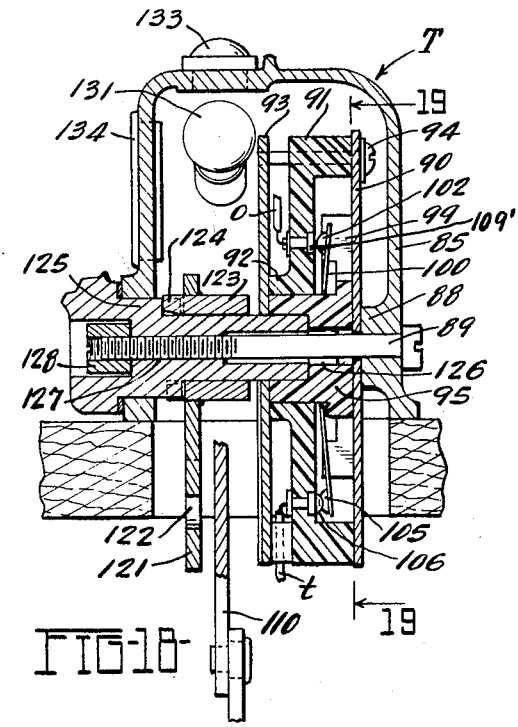
FIG-18-
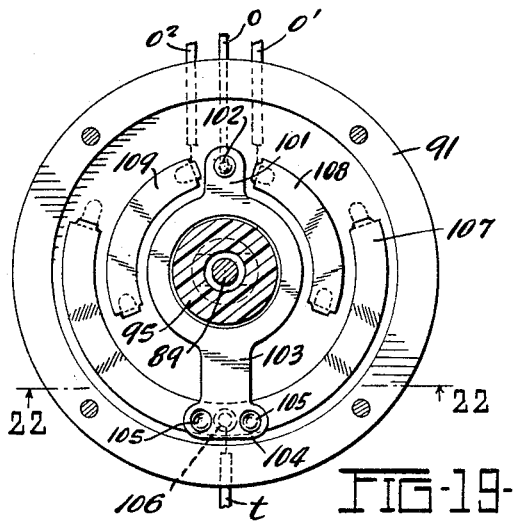
FIG-19-
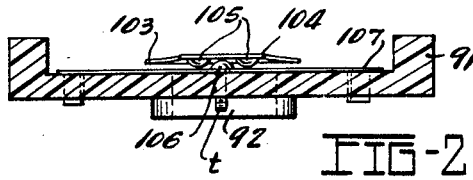
FIG-22-
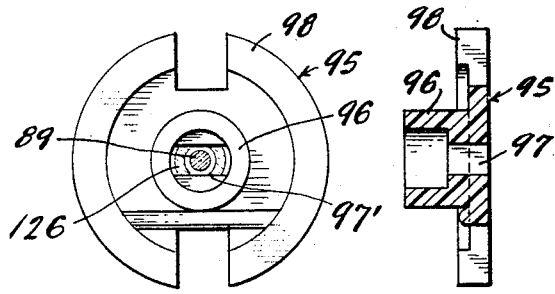
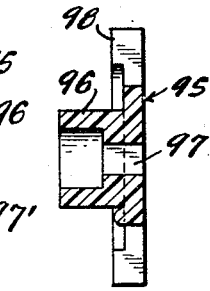
FIG-20- FIG-21-
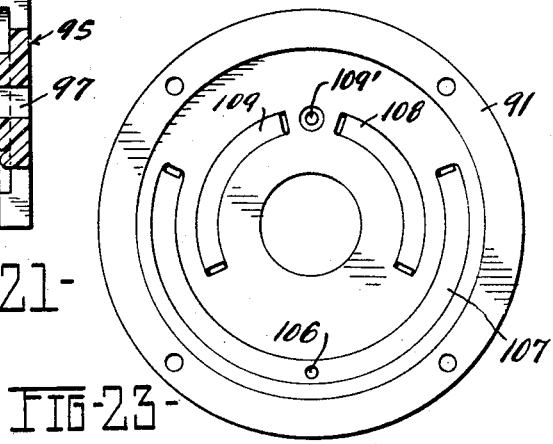
FIG-23-
INVENTOR:
JOHN B. PARSONS.
BY
ATTY.

United States Patent Office 2,916,031
Patented Dec. 8, 1959

2,916,031
REVERSE GEAR OPERATING SYSTEM FOR MARINE ENGINES

John B. Parsons, Maumee, Ohio

Application November 17, 1955, Serial No. 547,487

8 Claims. (Cl. 123—179)

This invention relates to controls for marine engines, but more particularly to control mechanisms for actuating the reverse gear mechanism controlling the direction of travel of the craft, as well as the engine starter mechanism.

An object is to produce a new and improved system for controlling and operating the reverse gear mechanism associated with a marine engine for not only automatically shifting the reverse gear mechanism as desired between neutral, forward and reverse positions, but also enabling convenient starting of the engine with the assurance that the reverse gear mechanism is first actuated to or disposed in its neutral position, so that starting of the engine can be achieved without liability of immediately placing the craft in motion.

Further objects and advantages will hereinafter appear, and for purposes of illustration but not of limitation, an embodiment of the invention is shown on the accompanying drawings, in which—

Figure 1 is a diagrammatic view showing the several components of the system schematically and the wiring diagram specifically, the components being the switch mechanism, the clutch position selector, the circuit selector which is mounted on the reverse gear shaft, the electric motor driven hydraulic pump and linear motor connected to the reverse gear arm;

Figure 2 is an elevational view of the switch mechanism and particularly the escutcheon plate and lock cylinder which receives the operating key;

Figure 3 is an enlarged longitudinal sectional view of the control switch mechanism;

Figure 4 is a sectional view of the inside of the base member of the switch mechanism with the separate contact spring removed;

Figure 5 is a side elevation of the control switch mechanism;

Figure 6 is a plan view of the outer side of the base of the switch mechanism showing the several contact terminals;

Figure 7 is a perspective view of the operating parts of the switch mechanism, certain parts being omitted for the purpose of clarity;

Figure 8 is a side elevation of the circuit selector;

Figure 9 is a sectional view substantially on the line 9—9 of Figure 8;

Figure 10 is a fragmentary sectional view on the line 10—10 of Figure 9;

Figure 11 is an enlarged view substantially on the line 11—11 of Figure 9;

Figure 12 is a perspective composite view of the parts of the circuit selector showing their relative positions;

Figure 13 is a perspective view of the rotor forming a part of the circuit selector;

Figure 14 is a perspective view of one of the side plates of the circuit selector;

Figure 15 is a front elevation of the clutch position selector and throttle control;

Figure 16 is a side elevation of the mechanism shown on Figure 15;

Figure 17 is an enlarged sectional view substantially on the line 16—16 of Figure 15;

Figure 18 is a vertical sectional view of the clutch position selector and throttle control;

Figure 19 is a section on the line 19—19 of Figure 18 showing the driver or actuator in section;

Figure 20 is a plan view of the driver or spring plate actuator;

Figure 21 is a sectional view of the driver or actuator shown in Figure 20;

Figure 22 is a schematic sectional view somewhat on the line 22—22 of Figure 19; and Figure 23 is a plan view of the cup member which carries the arcuate contact strips.

*Reverse gear control during engine starting period*

The illustrated embodiment of the invention comprises a system of control for the reverse gear shaft $Ra$ which actuates the clutch (not shown) for controlling the forward, and rearward propeller drive as well as the neutral position, all of which are well known in the art and requires no illustration. On the shaft $Ra$ is the usual reverse gear arm R for shifting same, and this arm is in this instance rocked by a linear motor L consisting of a piston rod pivoted to the lower end of the arm R and operating in a cylinder to opposite ends of which lead tubes $Ma$ and $Mb$. These tubes extend to a reversible electric motor driven hydraulic pump unit MP, so that, depending upon the direction of pump movement liquid is forced under pressure to one end or the other of the linear motor for effecting rocking of the reverse gear arm R to a forward operating or a rearward operating or to a neutral position.

Operation of the pump driving motor is controlled by a circuit selector S, a portion of which is mounted upon and turns with the reverse gear shaft $Ra$ and another portion of which is in effect stationary. The detail structure of the circuit selector will be described hereinafter. Suffice it to say here that the circuit selector S is connected to the pump driving motor by leads $S'$ and $S^2$ controlling the direction of motor operation for effecting forward and rearward movement respectively of the linear motor L and accordingly the reverse gear mechanism. Relays $S^{1a}$ and $S^{2a}$ are interposed in the leads $S'$ and $S^2$ respectively.

As will be described more fully later on, the circuit selector S causes the motor-pump unit MP to actuate the linear motor for shifting the reverse gear arm R and accordingly the shaft $Ra$ in one direction or the other. When the engine is operating, the control for the circuit selector S is made by a clutch position selector T which has leads O, O′ and $O^2$ extending to the circuit selector S. However the system is such that initially or during starting of the engine, current does not pass to the circuit selector S through the clutch position selector T. Thus, should the clutch position selector T be left in a forward or a reverse operating position, when the engine was previously shut off, the craft would not instantly be put accidently in motion and no damage would ensue. On the contrary, the system is such that before the engine is started, the reverse gear shaft $Ra$ is automatically shifted to neutral position. Of course if it were left in neutral, then no movement would result but if, when the engine was previously shut off, the clutch position selector T had been left in reverse or forward operating position, then before the engine is started, the reverse gear mechanism is shifted instantaneously to neutral position.

The above is made possible by a control switch mechanism K which is key operated between "Off," "Engine Start-Neutral," and "Run" positions. As shown on Figure 1, a battery b supplies current through a lead b' to a switch contact 1. When the key is turned from the "Off" position to the "Start" position, contact 1 is immediately connected electrically with the coil contact 5 and contact 2 which is connected by a branch lead O" to the lead O, causing current to pass directly to the circuit selector S, which is so designed as to pass current through the proper relay to the pump operating motor to cause the linear motor L to turn the reverse gear shaft Ra in the proper direction for shifting the clutch to neutral position.

In order to energize the engine starter mechanism (not shown) the switch key, when in the "Start" position, is pushed inwardly to engage the contact 3 and such inward movement can be effected only in the "Start" position, as will be more fully explained hereinafter.

Since the reverse gear mechanism has been placed or is in neutral position and the engine has been started, the final operation of the switch mechanism is to place it in "Run" position. This is effected by a further turn of the switch key to the "Run" position where the contact 1 from the battery and contact 5 to the engine coil are connected and also the battery contact 1 is connected to a contact 4 from which extends a lead t to the clutch position selector T. Now current passes to the selector T which is thus in control of the circuit selector S and actuation of the hand lever forming a part of the clutch position selector T determines whether the reverse gear is shifted to forward, rearward or neutral position. Also the engine throttle is operated concomitant with the shifting of this hand lever in a unique manner hereinafter described.

*Key operated control switch mechanism*

Referring particularly to Figures 2 to 7, the switch mechanism comprises an elongate tubular housing 11 preferably of plastic material which is formed with an integral enlarged cupped inner end 12. Fitting over the outer end portion of the housing 11 is a flanged cap or escutcheon 13 which may be of metal and on the outer face bears the legends "off," "neutral," and "run" and opposite thereto "push-start." The cap or escutcheon is held in place by a pair of elongate screws 14 which extend through a suitable supporting panel 15 and have clamping nuts 16 to bear against the inner face of the supporting panel for securely retaining the cap 13 in position. Manifestly the panel 15 is apertured so that the housing 11 can extend therethrough with the cupped end on the inner side of the panel. Mounted in the outer end of the housing 11 is a key lock cylinder unit 17 having a flanged outer end to abut against the outer end of the tubular housing. The lock cylinder unit 17 is of the conventional type to receive an operating key 18, there being a tongue or the like on the inner end of the cylinder which is turned in response to turning movement of the key. Fitting within the housing 11 for turning movements is a plastic adapter cylinder 19 which has a tongue and groove connection 20 with the lock cylinder so that turning of the tongue on the inner end of the lock cylinder imparts corresponding turning movement to the cylindrical adapter 19.

Suitably secured to the inner end of the adapter 19 and disposed within the cupped end 12 is a driver 21 also of plastic and of a diameter somewhat greater than the internal diameter of the tubular housing 11. The driver 21 is formed with diametrically opposed grooves 22 and extending transversely of the cupped end 12 and actuated by the driver 21 is a metallic spring contact arm 23 of brass or other suitable electrical conductive material. Formed in each end of the contact arm 23 are cup-shaped detents or buttons 24 and in the central portion of the arm 23 is a similar cup-shaped button 25. Formed centrally of the contact arm 23 are oppositely projecting extensions 26 terminating in rearwardly extending right angle flanges 27 which fit into the grooves 22 of the driver 21 so that turning of the driver imparts corresponding turning movement to the spring arm 23.

Fitting within the cup-shaped end 12 of the tubular housing 11 is a plastic disc-like base 28 which on the inner side is formed with four bosses 29 which are internally screw-threaded to receive the inner ends of the screws 14 and also to receive screws 30 (Figure 5), thereby to secure the base properly within the housing end portion. As particularly shown on Figure 4, the inner side of the base 28 is formed with a pair of diametrically extending grooves or channels 31 and 32 which are disposed at right angles to each other. It will be observed that the bosses 29 are arranged in pairs, the bosses of each pair being spaced slightly from each other and disposed on opposite sides of the groove or channel 31. At one end of the groove or channel 31 between the adjacent bosses 29 is a rounded projection or hump 33 for a purpose hereinafter to be described. At the opposite end of the groove 31 is a contact terminal 5a which forms part of the ignition coil contact 5 above referred to. A binding post 5b (Figure 6) disposed on the outside of the base 28 is connected to the contact element 5a and completes the contact 5.

Disposed within the groove or channel 31 is an electrically conductive spring metal contact arm 34, one end portion of which rests upon the hump 33 and the opposite end portion of which engages the contact terminal 5a, which it will be understood operates to transmit current to the ignition coil (contact 5) as above explained. In the center of the base 28 on the inner side thereof, is a contact terminal 3a which is normally out of contact with the contact arm 34. The contact terminal 3a is connected to a binding post 3b which together form the contact 3 for the engine starting mechanism (not shown).

Adjacent one of the bosses near the hump 33 is a contact terminal 1a and spaced slightly therefrom is a similar contact 1a, these two contact terminals being connected respectively to binding posts 1b which in turn are electrically connected by a buss bar 1c. The contact elements 1a, binding posts 1b and buss bar 1c constitute the contact 1 which is connected to the battery b above described. In the "off" position of the switch as shown on Figure 2, the spring contact arm 23 has its buttons 24 seated in shallow grooves 35, the arm 23 being slightly bowed under tension (Figure 3), thus putting the buttons 24 under tension so that they snap into the grooves 35 to indicate to the operator that the switch is in the "off" position. Manifestly in the "off" position, the spring contact arm 23 is out of engagement with the battery terminal elements 1a.

By turning the key 18 in a clockwise direction (Figure 2) one of the buttons 24 is brought into engagement with one of the contact terminals 1a and the other one is brought into contact with an oppositely disposed contact terminal 2a. The latter is connected to a binding post 2b disposed on the outer side of the base 28 and forms the neutral contact 2 above mentioned. Thus upon turning the key to the "neutral" position, current is delivered from the battery to the contact 2 and thence to the circuit selector S as above described. The spring arm 23 is thus in contact with the spring arm 34 and enabling current to pass from the battery contact 1 through the arm 23, arm 34 to the ignition coil terminal 5a. No current can pass to the engine starter mechanism because the arm 34 is normally spaced from the starter contact terminal 3a. Therefore in order to energize the engine starter mechanism it is necessary to push inwardly on the key 18 and impart an inward axial movement to the lock cylinder 17, adapter 20 and associated parts in order to force the contact spring 34 inwardly, flexing it so that it will engage the contact terminal 3a to deliver current thereto and out through the binding post 3b.

From the above it will be manifest that when the operating key 18 is moved from the "off" to the "neutral" position, current is first delivered to the circuit selector S and simultaneously to the ignition coil. By pushing inwardly on the key, current may be passed to the engine starter mechanism but this must necessarily be subsequent to the passing of current to the selector S.

A further turning movement of the key 18 in a clockwise direction (Figure 2) moves the spring contact arm 23 away from the neutral contact element 2a and onto a contact terminal 4a which is connected to a binding post 4b on the outside of the base 28 and constitutes the "run" contact 4, which is electrically the clutch position selector T as above explained, thereby placing the clutch position selector in normal operative position. However, as above pointed out, the first movement of the switch key mechanism is to energize the circuit selector S so that the reverse gear mechanism will be moved immediately to its neutral position if it is not already there. This takes place before the engine is started so that there is no liability of the craft being in motion when the engine is started and on the contrary insures that the engine clutch mechanism will at that time be in its neutral position. Manifestly in the "run" position of the central switch, it is not possible to depress the spring 34 to engage the starter terminal 3a because there is no groove or channel into which the contact spring 23 can be depressed. Thus engagement of the starter terminal can be made only when the switch key is in its "neutral" position.

*Circuit selector*

The circuit selector S above mentioned is shown in detail on Figures 8 to 14 and comprises a stationary cylindrical housing 40 of suitable plastic material. It is anchored to a metal strap 41, one end of which is suitably secured to a stationary support and the opposite end is curved conforming generally to the curvature of the housing 40. The curved end has an elongate slot 42 through which projects a screw-threaded stud 43 which is molded into the housing 40. Between the curved end of the strap 41 and the housing is a rubber washer or pad 44 and a knurled nut 45 secures the housing in place. Manifestly by loosening the nut, the position of the housing can be adjusted within limits.

The housing 40 has an internal inwardly extending integral annular wall 46 disposed midway of the side edges of the housing, thus leaving a space between the opposite edge portions of the housing and the adjacent sides of the wall 46. Depending from the upper portion of the wall 46 is a centrally disposed integral sector shaped web 47 and this extends downwardly approximately one-third of the diameter of the housing. This screw-threaded stud 43 extends deep into the web 47 particularly as shown on Figures 9 and 12. The lower end of the web 47 is formed into an arcuate surface 48, the sides of which are flat and project laterally a short distance from the sides of the web 47.

Keyed to the reverse gear shaft Ra so as to turn with it is a cylindrical rotor 49 of elongate tubular shape. The rotor is also of plastic material and is formed intermediate its ends with an integral raised cylindrical band 50 from which depends an integral sector shaped member 51, the sides of which are flat. As will hereinafter appear, the rotor 49 can rock or rotate relative to the housing 40 and the raised band 50 conforms to the curvature of the arcuate surface 48 but is free from contact therewith.

On opposite sides of the housing in telescopic engagement so that the inner faces thereof are juxtaposed to the adjacent sides of the annular wall 46, are adjuster plates 52 and 53 respectively, these plates also being of plastic material. Each plate is formed with an integral internal annular rib 54a arranged slightly inwardly of the inner side of the annular wall 46. A washer 54 is interposed between each of the plates 52 and 53 and the adjacent side edge of the annular wall 46 in order to effect a sealing engagement therewith. Disposed centrally of each of the adjuster plates 52 and 53 is an outwardly extending annular boss 54b which is provided with a round hole to fit over the adjacent end of the rotor 49. Suitable packing rings 54c are interposed between the boss 54b and the rotor 49 similarly to effect a sealing between these relatively moving parts.

In opposite sides of the housing 40 are screw-threaded studs 55, which are molded in the housing and project outwardly from opposite sides. As shown, four of these studs are provided and each receives knurled thumb-nuts 56, which have washers overlapping the adjacent adjuster plate for holding them in position.

On the upper end of each of the adjuster plates 52 and 53 is an integral upstanding tab 57 which in this instance is of curved form and each tab projects into a groove 58, one being formed on each side of the housing 40. The grooves 58 are of sufficient length to enable the respective adjuster plate to be rotatively adjusted sufficiently to arrange the contact elements in proper relation as will hereinafter appear.

Secured to the inner side of each of the adjuster plates 52 and 53 is a flat ring; one ring 59 being secured to the adjuster plate 53 while a similar ring 60 is secured to the adjuster plate 52. These rings are of electrically conductive material, such as brass, and each is formed with diametrically opposed holes 61 through which rivets extend through holes 61a in the respective plate for retaining the rings in position. At the upper portion of each of the rings is formed a countersunk hole 62 for the reception of binding posts as will hereinafter appear. At the lower portion of the ring 59 is a flat arcuate portion 59a, and a similar portion 60a is formed on the ring 60. Each of the arcuate portions is pressed outwardly or in a direction away from the respective adjuster plate to provide flat curved contact surfaces engageable by spring members for delivering current to the binding posts connected to the countersunk holes 62. Extending through the countersunk hole 62 in the ring 59 is a terminal consisting of a binding post 63 to which the lead $S^2$ above mentioned is connected. On the ring 60 and extending through the countersunk hole 62 is a terminal consisting of a binding post 64 to which the lead $S^1$ is connected.

Rotatable with the rotor 49 and arranged to engage contacts on the housing 40 and adjuster plates 52 and 53, are contact springs 65 and 66 which are very similar to each other. These springs are preferably of spring metal, such as beryllium copper, and each comprises a central annulus or flat ring 67 and integral with the ring and extending in diametrically opposed relation are substantially T-shaped contact arms 68 and 69 which are connected to the ring by relatively short necks. The arm 68 is somewhat larger and extends laterally to a greater extent than does the arm 69. As shown, the free lateral ends of each of the contact arms 68 and 69 are folded back upon themselves as indicated at 68a and 69a. However, it will be noted that the folded portions 68a are disposed on the inner side and the folded portions 69a are disposed on the outer side. Buttons 70 and 71 are formed in each of the contact springs, the button 70 being uppermost and projecting inwardly whereas the lower button 71 projects outwardly. The button 71 engages and rides along the raised portons 59a and 60a of the rings 59 and 60 respectively. It will be apparent that the contact springs 65 and 66 slip over the opposite ends of the rotor 49 and abut against the adjacent edge of the raised band 50.

In the lower contact arm 69 of the spring 65 is a centrally disposed hole 73 which fits over a pin 72 disposed at one end portion of the depending rotor sector 51, thus constituting a positive drive for rocking the contact spring 65. On the opposite side of the sector 51 is a similar pin 74 but disposed at the end of the sector opposite to that of the pin 72. The pin 74 projects through a hole 75 in the lower contact arm 69 of the contact spring 66. Thus it will be apparent that the springs 65 and 66 are arranged crosswise relative to each other, substantially as shown on Figure 11.

For insuring that the contact springs 65 and 66 are applied properly and to assist in driving same, a rib 75' is arranged on the underside of the raised rotor band 50 and in each of the contact springs 65 and 66 is a notch 76 to fit over the rib 75'. However, the notches in the contact springs are differently arranged when mounted as will be apparent from an examination of Figure 12. In this manner the proper mounting of the contact springs on the rotor is assured.

In the lower end of the housing 40 and on the inside thereof is a contact terminal or head 77 from which extends a binding post 78 to receive the lead O extending from the clutch position selector T as above mentioned. In the upper portion of the adjuster plate 53 is a binding post 79 to which the lead $O^2$ from the clutch position selector T is attached. The binding post 79 has a terminal or contact head 80 on the inner side of the adjuster plate for contact by the upper end portion or contact arm 68 of the contact spring 65. Similarly arranged on the adjuster plate 52 is a binding post 81 to which the lead O' from the clutch position selector T is connected. The binding post 81 has a terminal or contact head on the inner side of the adjuster plate for engagement by the arm 68 of the contact spring 66.

In the operation of the circuit selector S, it will be understood that in starting the engine as above explained with the key 18 turned from its "off" position to its "neutral" position, current can pass to the binding post 78 through the lead O and in the event that the reverse gear shaft $R^a$ is in neutral position, then the arm 69 of the contact springs 65 and 66 will be out of contact with the terminal contact 77 so that no movement will be imparted to the reverse gear shaft. Of course if the reverse gear shaft is in its neutral position, then no movement is desired of it during the starting of the engine. However, let us assume that the clutch position selector has been left previously in the position so that the reverse gear shaft $R^a$ has moved the clutch to the reverse position. In such an event, the contact arm 69 of the spring 66 will be in contact with the terminal 77 so that current will flow through the contact spring, through the ring 60 to the solenoid $S^{1a}$ for causing the motor pump unit M to actuate the linear motor for shifting the reverse gear arm and shaft toward neutral position and when that is reached, the circuit is broken and the current is automatically shut off. Likewise if the reverse gear shaft is in position so that the clutch is in its forward position, then the reverse obtains and the unit M operates to return the shaft and its clutch to its neutral position.

As will hereinafter appear, however, current may be delivered to the circuit selector S through the leads $O^1$ and $O^2$ from the clutch position selector T as well as O for causing current to flow to the motor pump unit M to effect the desired movement of the reverse gear shaft $R^a$ through the linear motor L as will be readily understood.

*Throttle control and clutch position selector*

The throttle control and clutch position selector T comprises an arcuate housing 85 which is closed at its top portion and has an open underside. The bottom side of the housing rests upon a support 86 which is apertured so that the operative parts can extend therethrough, screws 87 securing the housing to the support. On one side wall of the housing is an internal boss 88 through which an elongate screw 89 extends transversely. Abutting the inside of the boss 88 is a flat plate 90 of suitable sheet material and abutting against the inner face of the plate 90 at its periphery is a cupped shaped member 91 of plastic material which has an outwardly extending hub portion 92 against which a flat palte 93 abuts, this plate also being of electrical insulating material. A series of screws 94 extend through the plates 90, 93 and the peripheral portion of the cup member 91 to hold these parts in assembled relation.

Rotatable within the hub 92 is a switch plate actuator 95 (Figures 20 and 21) formed with an outwardly projecting hub 96 having a cylindrical bore 97 through which the screw 89 freely extends and adjacent thereto is a tennon-receiving portion 97' disposed interiorly of the hub 96. The actuator 95 is generally disk-shaped and is formed with an inwardly projecting rim 98 provided with a pair of diametrically opposed cutouts 99 generally rectangular in shape to receive end portions of a spring contact plate 100 and impart a movement thereto as the actuator 95 is rocked in one direction or the other.

The spring contact plate 100, which in this instance is of beryllium copper, is relatively thin to provide the desired resilience or spring action. A tab 101 at its upper end fits in the upper cutout 99 and is formed with an inwardly extending contact button 102. At the lower end of the spring contact plate 100 is a downwardly extending arm 103 which extends into the lower cutout 99. The extremity of the arm 103 is enlarged as indicated at 104 and is provided with laterally spaced inwardly extending contact buttons 105. It will be apparent that the intermediate portion of the contact plate 100 is ring shaped to fit over the hub 96 of the actuator 95.

On the inside of the cup member 91 adjacent the contact buttons 105 and disposed to be engaged by same is a button-like terminal 106 to which is connected the lead $t$ extending from the "run" contact 4 of the switch mechanism above described. The contact button 106 forms an integral part of an arcuate contact strip 107 (Figures 19 and 23) thus enabling the contact buttons 105 on the spring contact plate 100 to contact the strip 107 for a substantial movement of the actuator 95. The spacing of the contact buttons 105 is such as to receive the contact button 106 therebetween to enable the operator to feel the position thus achieved when the contact spring is moved to its neutral position. As shown, the contact strip 107 is of an area slightly greater than one-half a circle.

Disposed inside of the contact strip 107 and at the upper portion of the cup housing 91 are two curved contact strips 108 and 109 to which the leads $O^1$ and $O^2$ extend respectively. The adjacent ends of these contact strips are spaced from each other so that the tab 101 at the upper end of the contact spring can be disposed therebetween without touching either of these strips. Thus when the contact spring or plate 100 is in its neutral position with the contact button 106 disposed between the buttons 105, then the tab 101 is disposed between the curved contact strips 108 and 109, thereby militating against current passing through either of the leads $O^1$ and $O^2$ but directing current to the terminal 109' to which the lead O is connected.

By rocking the actuator 95 in a clockwise direction (Figure 19) current is passed from the contact strip 107 through the contact spring to the contact strip 108 and thus through the lead $O^1$ to the circuit selector S as above explained. Similarly when the actuator 95 is rocked in a counter-clockwise direction so that the contact button 102 engages the contact strip 109, then the circuit is established including the lead $O^2$ leading to the circuit selector S, the contact spring, the contact strip 107 and lead $t$ extending from the "run" position of the switch mechanism K.

Associated with and forming a part of the clutch position selector is throttle control mechanism for opening and closing the throttle concomitant with the establishing of electrical circuits for shifting the reverse gear mechanism into its forward or rearward operating position and during the time that such positions have been established. For this purpose, a control arm 110 is connected at its lower end through suitable linkage, a Bowden wire and the like to the engine throttle valve (not shown). The upper end of the arm 110 is mounted on a pivot pin 111 (Figure 17) so that it can rock about such pivot.

Associated with the pivot pin 111 is an adjusting pivot gear sector 112, the teeth of which are engageable by a series of axially spaced annular flanges or teeth 113 on a horizontally disposed adjusting screw 114 which screw-threadedly engages the housing 85. On the outside of the housing is a knob 115 for actuating the adjusting screw 114, a spring tensioned ball 116 engaging the screw threads on the adjusting screw to hold the screw in its position of adjustment and militating against it being displaced due to jars or shocks. Forming a part of the adjusting pivot gear 112 is an eccentric cam 117 carrying the pivot 111 so that by turning the knob 115 of the adjusting screw 114 and thereby rocking the pivot gear 112, the position of the pivot pin 111 may be changed by raising or lowering it for a purpose hereinafter described.

Fixed to the throttle control arm 110 a short distance from its pivotal mounting is a laterally projecting pin 120 which extends into a cam slot 122 carried by a rockable plate 121. The intermediate portion of the slot 122 is on an arc concentric with the axis of the plate 121 but the opposite end portions of the slot curve abruptly inwardly thereby to effect a greater movement to the arm 110 at these regions and thus opening the throttle valve to a greater extent. During the intermediate movement of the rockable plate 121 very little movement is imparted to the throttle control arm 110 but as the plate 121 moves so that the end portions of the slot 122 engage the pin 120, a quite appreciable movement is imparted to the throttle control arm. Thus in the operation of the clutch position selector T, the intermediate movement which closes the circuits for placing the reverse gear mechanism either in its forward or rearward operating positions, the movement of the throttle is negligible. However, after these positions have been established, then the throttle is opened substantially increasing the engine speed to the desired extent.

The rocking plate 121 which actuates the throttle control arm, has a sleeve 123 which may be hydrogen brazed to it and at one end of the sleeve 123 are tenons 124 operatively engaging recesses in a shouldered portion of a hub sleeve 125 which forms a part of a control arm. The sleeve 125 has a bore, a portion of which is threaded to receive the threaded end portion of the screw 89, such threads being indicated at 127. At the inner end of the hub sleeve are tenons 126 operatively engaging the actuator 95 so that by turning the sleeve in one direction or the other, the actuator 95 is accordingly rocked. On the inner end of the screw 89 and disposed in a socket in the end of the hub sleeve 125 is a lock nut 128. By loosening the lock nut 128, and adjusting the screw 89 in or out, the friction imposed by the screw is varied, the switch housing parts being of a yielding nature.

On the outer end of the hub sleeve 125 is a lever arm 129 which extends at substantially right angles thereto and has an operating knob 130 at its free end. Manifestly by rocking the lever arm 129 in one direction or the other, not only are the proper circuits established through the spring contact plate 100 and the contact strips 107 and 108 or 109, but also the engine throttle is concomitantly operated so that when the desired circuits have been established and the reverse gear disposed in forward or reverse operating position, the throttle can be opened for accelerating the engine speed as desired.

The adjustment effected by turning the knob 115 in one direction or the other enables separate throttle adjustment, particularly idling adjustment. By turning the knob 115, the eccentric 117 raises or lowers the pivot 111 for the throttle arm 110, thereby controlling the initial opening of the throttle valve. This is often desirable when the engine is first started for increasing the supply of fuel to the engine and preventing stalling. It also enables the idling to be controlled when the craft is used for trolling.

Disposed within the housing 85 is a lamp bulb 131 which when lighted is visible through a lens 133 on the top wall of the housing. Access to the bulb can be gained through a removable plate 134 in a side wall of the housing. As indicated on Figure 1, the lamp is suitably grounded at 135 and is connected by a lead 136 to the pump-motor unit M, the arrangement being such that whenever the pump driving motor is operating, the lamp 131 is lighted, thus serving as a visual indication to the operator. Manifestly if the lamp is lighted constantly, it indicates to the operator that the mechanism is not operating properly.

What I claim is:

1. In a system for actuating the reverse gear of an engine including a double-acting linear motor for imparting to and fro reverse gear movement, means for motivating said linear motor, a circuit selector shiftable for establishing circuits to energize said motivating means for selectively operating the latter to move the linear motor to cause movement between forward, neutral and reverse positions, and a source of current, the improvement which comprises control switch mechanism having a neutral-engine start position, means for establishing an electrical circuit when said switch mechanism is in the neutral-engine start position between the source of current and said circuit selector for causing said motivating means to shift the linear motor either from forward or reverse position to neutral position, an electrical circuit for starting the engine, and means for actuating said control switch to establish said last circuit after said first circuit has been established, thereby to militate against starting the engine when the reverse gear is in any position but neutral.

2. In a system for actuating the reverse gear of an engine including a double-acting linear motor for imparting to and fro reverse gear movement, means for motivating said linear motor, a circuit selector shiftable for establishing circuits to energize said motivating means for selectively operating the latter to move the linear motor to cause movement between forward, neutral and reverse positions, and a source of current, the improvement which comprises control switch mechanism having a neutral-engine start position, means for establishing an electrical circuit when said switch mechanism is in the neutral-engine start position between the source of current and said circuit selector for causing said motivating means to shift the linear motor either from forward or reverse position to neutral position, an electrical circuit for starting the engine, and means effectuated by an axially movable control switch part for actuating said control switch to establish said last circuit after said first circuit has been established, thereby to militate against starting the engine when the reverse gear is any position but neutral.

3. In a system for actuating the reverse gear of an engine including a double-acting linear motor for imparting to and fro reverse gear movement, means for motivating said linear motor, a circuit selector shiftable for establishing circuits to energize said motivating means for selectively operating the latter to move the linear motor to cause movement between forward, neutral and reverse positions, and a source of current, the improvement which comprises control switch mechanism having a neutral-engine start position, and a run position, a clutch position selector electrically connected with the control switch mechanism and the circuit selector for selectively establishing circuits through the circuit selector for forward, reverse and neutral operating positions of the reverse gear, means for establishing an electrical circuit when said switch mechanism is in the neutral-engine start position between the source of current and said circuit selector for causing said motivating means to shift the linear motor either from forward or reverse position to neutral position, an electrical circuit for starting the engine, means for actuating said control switch to establish said last circuit after said first circuit has been established, thereby to militate against starting the engine when the reverse gear is in any position but neutral, and means for delivering current directly to the clutch position selector from said control switch mechanism when the latter is disposed in run position.

4. In a system for actuating the reverse gear of an engine comprising means operatively connected to actuate the reverse gear between neutral, forward and reverse operating positions, said means including a reversible electric motor, a circuit selector operatively connected for movement with the reverse gear and including movable contact members engageable with stationary terminals electrically connected with said motor thereby to establish circuits to energize the latter for actuating the reverse gear to a predetermined position, a control switch mechanism manually shiftable between off, engine start-neutral and run positions, a source of current, means for establishing a circuit comprehending said selector and switch mechanism when the latter is in its engine-start-neutral position for passing current to the selector and thence to said electric motor for actuating said reverse gear to neutral position, said switch mechanism being movable to establish a circuit for engine starting purposes after said neutral establishing circuit has been made, a clutch position selector including movable contact members engageable with stationary terminals electrically connected to said circuit selector for delivering current thereto for effecting through it predetermined operation of said electric motor, and a power lead between said clutch position selector and said switch mechanism for delivering current to the former when the latter is shifted to run position.

5. The organization as claimed in claim 4 in which the circuit selector comprises a stationary part and a rotatable part, and a mounting for the rotatable part on the reverse gear shaft.

6. The organization as claimed in claim 4 in which the control switch mechanism is actuated in axial direction for engine starting purpose and rotatively otherwise.

7. The organization as claimed in claim 4 comprising throttle valve actuating means associated with and movable by said clutch position selector, said last means including means for effecting relatively slight opening of the throttle during the establishment of circuits to effect reverse gear operation and appreciably greater opening thereafter.

8. The organization as claimed in claim 4 comprising signal means for indicating the period during which the hydro-electric means is operating.

References Cited in the file of this patent

UNITED STATES PATENTS

| | | |
|---|---|---|
| 1,599,875 | Chryst | Sept. 14, 1926 |
| 1,600,660 | Winning | Sept. 21, 1926 |
| 2,135,958 | Troutner | Nov. 8, 1938 |
| 2,154,796 | Whittington | Apr. 18, 1939 |
| 2,241,677 | Sheldrik | May 13, 1941 |
| 2,280,407 | Harder et al. | Apr. 21, 1942 |
| 2,296,563 | Moller | Sept. 27, 1942 |
| 2,579,172 | Bordelon | Dec. 18, 1951 |
| 2,705,487 | Morse | Sept. 5, 1955 |
| 2,744,176 | Kaman | May 1, 1956 |